(12) United States Patent
Alasti et al.

(10) Patent No.: US 6,574,693 B1
(45) Date of Patent: Jun. 3, 2003

(54) METHOD AND APPARATUS FOR GATING INTERRUPTS IN A COMPUTING SYSTEM

(75) Inventors: Ali Alasti, Los Altos, CA (US); Nguyen Q. Nguyen, San Jose, CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/416,144

(22) Filed: Oct. 11, 1999

(51) Int. Cl.[7] .............................. G06F 9/48; G06F 13/26
(52) U.S. Cl. ...................... 710/262; 710/49; 710/266
(58) Field of Search .............................. 710/260, 264, 710/266, 269, 48, 49, 40, 262; 700/2; 709/103; 340/500; 712/1

(56) References Cited

U.S. PATENT DOCUMENTS 3,676,861 A * 7/1972 Ruth
4,003,028 A * 1/1977 Bennett et al.
5,155,812 A * 10/1992 Ehlig et al.
5,237,692 A * 8/1993 Raasch et al.

* cited by examiner

*Primary Examiner*—Gopal C. Ray
(74) *Attorney, Agent, or Firm*—Vedder, Price, Kaufman & Kammholz

(57) ABSTRACT

A method and apparatus for processing interrupts in a computing system include processing for ordering a plurality of interrupts for at least one processor. Such interrupts include system event interrupts, external device interrupts, and may further include power management interrupts, interprocessor interrupts, and/or intraprocessor interrupts. Such processing continues by generating an interrupt enable/disable signal based on the current context of a corresponding processor such that when the processor is performing a particular task which should not be interrupted, an interrupt signal is prevented from being provided to the processor. The processing also includes generating masking information to provide enable/disable masking information regarding each of the plurality of interrupts. As such, the computing system may enable/disable on a per interrupt basis the processing of a given interrupt. Such selectability in the processing of interrupts on an individual basis or global basis may be processed dynamically thereby providing greater flexibility and efficiency in interrupt processing.

20 Claims, 15 Drawing Sheets

METHOD AND APPARATUS FOR GATING INTERRUPTS IN A COMPUTING SYSTEM

TECHNICAL FIELD OF THE INVENTION

This invention relates generally to computers and more particularly to processing interrupts therein.

BACKGROUND OF THE INVENTION

Computers are known to include software and hardware. The hardware includes a central processing unit (CPU), system memory, a memory interfacing chipset, video graphics processing circuitry, and input/output ports. The software includes an operating system (e.g., Windows 98™), drivers, application interfaces (API), and a plurality of applications (e.g., word processing, spreadsheets, drawings, games, etc.). Such software and hardware work in concert to provide a user with a very powerful tool.

To ensure that the computer operates properly, it periodically interrupts the current processing of an application for system level verifications to ensure proper behavior of the computer. Such system level interrupts include system management interrupts (SMI) and non-maskable interrupts (NMI), which provide system level functions such as close/open door, fan on/off, start/stop clocks, turn-on/off power supply, hardware initialization (HW INIT), power management interrupts, etc. The computer also processes application level interrupts, which are initiated by internal or external devices of the computer. For example, a device coupled to the PCI bus of the computer may initiate an interrupt requesting access to a PCI bus. Alternatively, an interrupt may be received via an Internet connection, an Ethernet connection, etc.

FIG. 1 illustrates the relevant portions of a computer for processing both system level interrupts and application, or device, level interrupts. Such relevant portions include a south bridge, north bridge (which comprise the memory interfacing chipset), and a central processing unit. The south bridge includes a hard-coded interrupt controller and an interrupt state machine. The interrupt controller is operably coupled to receive external device interrupts, or application level interrupts. The interrupt state machine is operably coupled to receive system event interrupts, i.e., system level interrupts. The interrupt state machine processes the system event interrupts by detecting initiation of a system level interrupt and providing information to the interrupt controller as to which particular system level interrupt has been initiated. The interrupt controller processes the system level interrupt as a system management interrupt. The interrupt controller also processes the application level interrupts (i.e., the external device interrupts) as non-maskable interrupts. Note that in many systems, the system level and application level interrupts may be processed as non-maskable interrupts.

The system management interrupts and/or the non-maskable interrupts are provided to the central processing unit for processing. Upon receipt of an interrupt, the central processing unit stops its current processing to perform the interrupt. Note that based on the context of the central processing unit, it may be a very inopportune time to process the interrupt. For example, depending on the particular action, i.e., context, of the central processing unit, processing should not be interrupted. For example, generating display data, receiving Ethernet data, modem signals, etc. Nevertheless, when the central processing unit is in one of these contexts and an interrupt is received, the processing of these certain function is stopped and the interrupt is processed. As such, data may be lost and/or corrupted.

The central processing unit is shown to include a gate, which is operably coupled to receive a hardware initialization system level interrupt. The hardware initialization interrupt is used to reset caches within the central processing unit and may also be used to reset registers within the central processing unit. As such, the hardware initialization interrupt, resets the central processing unit by overriding any data stored within the cache and/or registers which may cause loss of data if not properly executed.

While the computer of FIG. 1 processes system level and application, or device, level interrupts fairly well, a hard coding of the interrupt controller fixes the priority scheme for processing the interrupts. As such, changes to prioritization of interrupt processing can only be achieved by hard wire changes, which cannot be effectively done in an operational setting. Thus, a computer must function in accordance with the hard coded interrupt prioritization scheme even though, under certain operating conditions, it is not the most efficient scheme.

In addition, the interrupt processing does not allow the central processing unit to customize power down and/or power savings interrupt for more efficient restarts. Further, the interrupt processing does not allow for interprocessor interrupts or intraprocessor interrupts. Such features would provide the computer architect greater flexibility in designing a computer that more efficiently processes interrupts under all operating conditions.

Therefore, a need exists for a method and apparatus for processing interrupts in a dynamic manner that allows for power management customization, interrupt processing customization, interprocessor interrupts and intraprocessor interrupts.

DETAILED DESCRIPTION OF A PREFERRED EMBODIMENT

Generally, the present invention provides a method and apparatus for processing interrupts in a computing system. Such a method and apparatus include processing for ordering a plurality of interrupts for at least one processor. Such interrupts include system event interrupts, external device interrupts, and may further include power management interrupts, interprocessor interrupts, and/or intraprocessor interrupts. Such processing continues by generating an interrupt enable/disable signal based on the current context of a corresponding processor such that when the processor is performing a particular task which should not be interrupted, an interrupt signal is prevented from being provided to the processor. The processing also includes generating masking information to provide enable/disable masking information regarding each of the plurality of interrupts. As such, the computing system may enable/disable on a per interrupt basis the processing of a given interrupt. Such selectability in the processing of interrupts on an individual basis or global basis may be processed dynamically thereby providing greater flexibility and efficiency in interrupt processing. With such a method and apparatus, the processing of interrupts is done in a dynamic manner that allows for customization of power management interrupts, customization of system level, application level interrupts and further allows for processing of interprocessor interrupts and intraprocessor interrupts.

Figure 1:
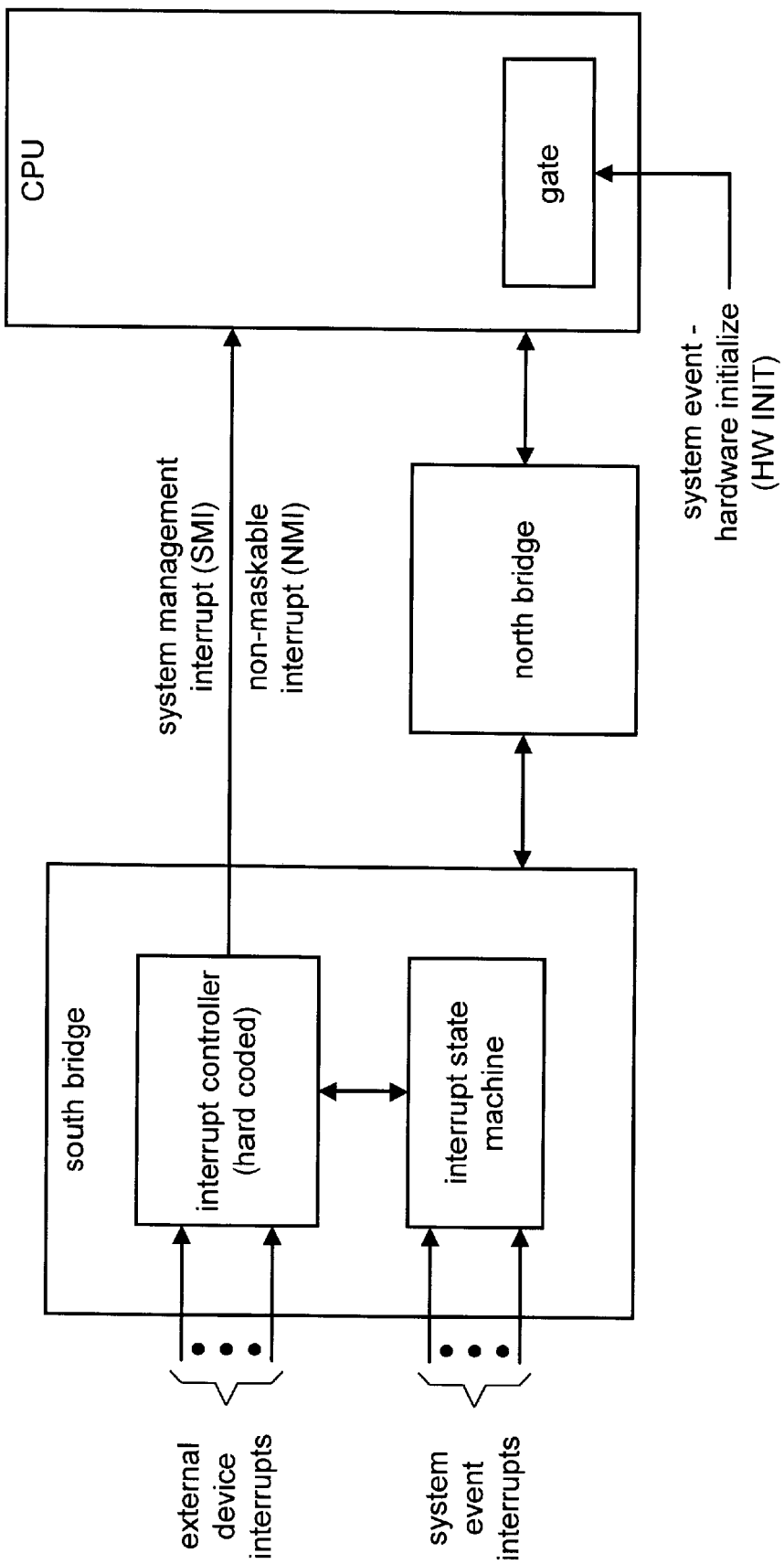
FIG. 1 illustrates a schematic block diagram of a portion of a prior art computer.
Figure 2:
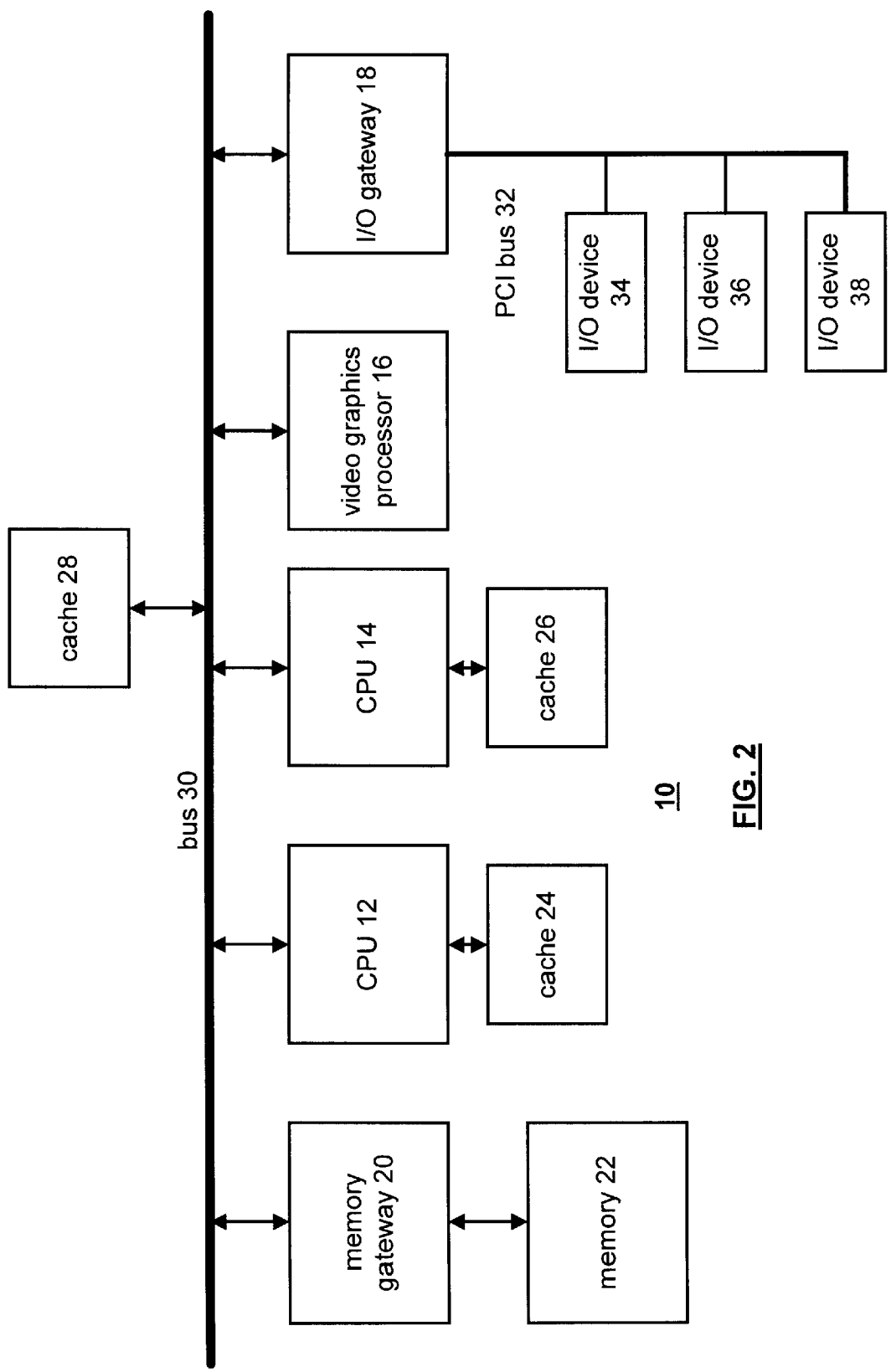
FIG. 2 illustrates a schematic block diagram of a computing system in accordance with the present invention.

The present invention can be more fully described with reference to FIGS. 2 through 15. FIG. 2 illustrates a schematic block diagram of a computing system 10 that includes a plurality of processors 12 and 14, a video graphics processor 16, an I/O gateway 18, a memory gateway 20, a bus 30, and cache memory 28. The memory gateway 20 is operably coupled to a memory 22 and the I/O gateway 18 is coupled to a plurality of I/O devices 34–38 via a PCI bus 32. The computing system 10 is also shown to include cache memory 24 and 26 operably coupled to processors 12 and 14. In various embodiments of computing system 10, the system may only include cache memory 28, include only cache memories 24 and 26 or include all three caches 24, 26 and 28. For a more detailed discussion of sharing cache in such a computing system 10 refer to copending patent application entitled "Method and Apparatus for Sharing Cache Memory" a Ser. No. of 09/328,844 and a filing date of Jun. 6, 1999.

The computing system 10 may be implemented as an integrated circuit wherein the bus is a low latency high-bandwidth data bus. In one embodiment, the bus 30 may include a 256 data bit line and operate at 500 megahertz. For a detailed discussion of the functionality of bus 30, refer to co-pending patent application entitled "Method and Apparatus for Busing Data Elements" a Ser. No. of 09/328,971 and a filing date of Jun. 6, 1999. In general, the transaction placed on bus 30 utilize the physical address space of the computing system.

The I/O devices 34–38 may be sound cards, television encoder cards, MPEG decoders/encoders (e.g., digital satellite transceivers), a display (e.g., an LCD display, CRT monitor), and/or any peripheral computer device that interfaces with the computing system 10 via the PCI bus 32.

Figure 3:
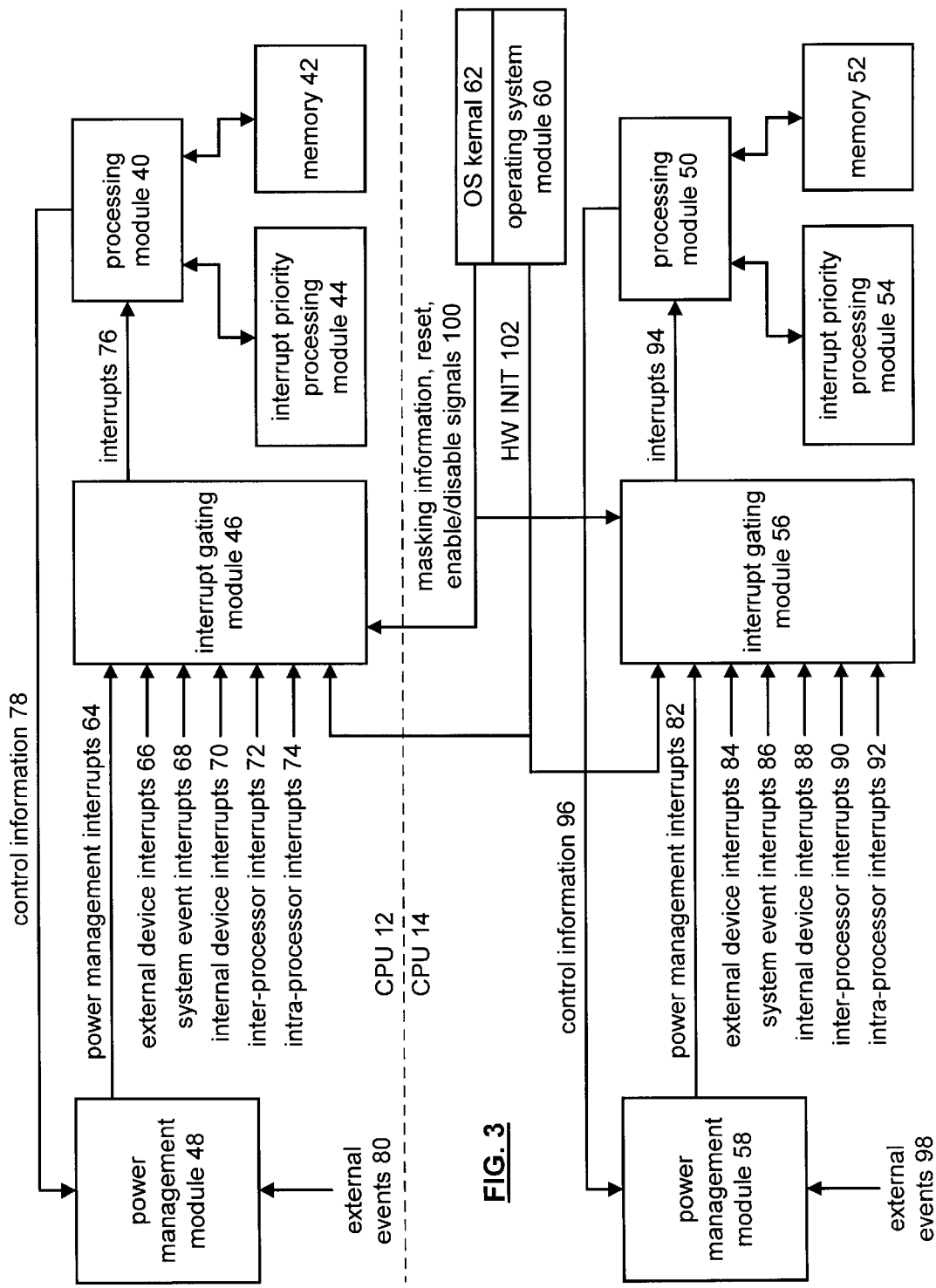
FIG. 3 illustrates a schematic block diagram of the central processing units of FIG. 2 in accordance with the present invention.

FIG. 3 illustrates a schematic block diagram of the central processing unit 12 and central processing unit 14. Note that the computing system 10 of FIG. 2 may include more central processing units or may include a single processing unit. If the computing system 10 includes a plurality of central processing units, the central processing units will have a similar construct for processing interrupts as shown in FIGS. 3 and/or 4. If the computing system 10 includes a single processing unit, the central processing unit will have a construct for processing interrupts similar to that shown in FIG. 5. Note that various elements of FIGS. 3, 4 and 5 may be incorporated and/or excluded from the construct of the central processing unit depending on the desired operation of the central processing unit in managing interrupts. For example, each of the central processing units in the multi-processing environment may include an interprocessor interrupt module and an intraprocessor interrupt module.

The central processing unit 12 includes a processing module 40, memory 42, an interrupt priority processing module 44, an interrupt gating module 46 and a power management module 48. The processing module 40 may be a single processing device or a plurality of processing devices. Such a processing device may be a microprocessor, microcontroller, microcomputer, digital signal processor, state machine, logic circuitry and/or any device that manipulates signals (analog and/or digital) based on operational instructions. The memory 42 may be a single memory device or a plurality of memory devices. Such a memory device may be random access memory, read-only memory, floppy disk memory, zip drive memory, system memory, magnetic tape memory, and/or any other device that stores operational instructions. Note that if the processing module implements one or more of its functions via a state machine or logic circuitry, the memory storing the corresponding operational instructions is embedded within the circuitry comprising the state machine and/or logic circuitry.

Central processing unit 14 includes a processing module 50, memory 52, interrupt priority processing module 54, interrupt gating module 56, power management module 58, operating system module 60 and operating system kernel 62. The processing module 50 may be a single processing device or a plurality of processing devices. Such a processing device may be a microprocessor, microcontroller, microcomputer, digital signal processor, state machine, logic circuitry, and/or any device that manipulates signals (analog and/or digital) based on operational instructions. The memory 52 may be a single memory device or a plurality of memory devices. Such a memory device may be a random access memory, read-only memory, floppy disk memory, system memory, hard drive memory, magnetic tape memory, reprogrammable memory, and/or any device that stores digital information. Note that when the processing module 50 implements one or more of its functions via a state machine or logic circuitry, the memory storing the corresponding operational instructions is embedded within the circuitry comprising the state machine and/or logic circuitry.

The interrupt gating modules 46 and 56 are operably coupled to receive power management interrupts 64 and 82, external device interrupts 66 and 84, system event interrupts 68 and 86, internal device interrupts 70 and 88, interprocessor interrupts 72 and 90, and intraprocessor interrupts 74 and 92, and hardware initialization interrupts 102, respectively. The power management interrupts 64 and 82 are generated by the power management modules 48 and 58, respectively. As will be described in greater detail with reference to FIGS. 13 through 15, the power management modules 48 and 58 generate the power management interrupts 64 and 82 based on control information 78 and 96. The control information may be generated by the processing modules 40 and 50, respectively, and/or by the operating system module 60. Such control information may establish the particular clock rate for given clocks within the computing system 10, power down conditions, sleep mode conditions and/or restart conditions. The power management module 48 and 58 are also shown to receive external events 80 and 98. The external events, such as power on/power off, wake up, etc., are processed by the power management module 58 to produce the corresponding power management interrupt 64 and/or 82.

The external device interrupts 66 and 84 correspond to application level interrupts. As such, the external device interrupts may be generated in accordance with the processing of an application, via an Internet connection, via an Ethernet connection, from a PCI device, etc. The system event interrupts correspond to the system level interrupts such as fan on/fan off, start/stop of clocks, turn on/off of power supply, close/open door, etc. The internal device interrupts 70 and 88 may be produced by the memory gateway 20 and/or the I/O gateway 18. As such, when the corresponding elements coupled to a gateway 18 or 20 require interrupt processing, the corresponding gateway 18 or 20 provides an interrupt to the central processing unit 12 and/or 14. The interprocessor interrupts 72 and 90 correspond to interrupts generated by a different processor. For example, central processing unit 12 may generate an interrupt for central processing unit 14, or vice-versa. Note that in a multi-processor computing system, one processor will be performing one function while another processor may be performing another function. If such functions are interrelated, or interdependent, interrupts between the two processors will be common. The intraprocessor interrupts 74 and 92 are generated by the respective processor. As such, central processing unit 12 generates intraprocessor interrupts for itself while central processing unit 14 generates intraprocessor interrupts 92 for itself The intraprocessor interrupts 74 and 92 include interrupts to change the functionality of processing module 40 or 50, maintenance and/or diagnostics of the corresponding central processing unit, and/or any other desired interrupt function within a central processing unit.

The interrupt gating modules 46 and 56, which will be described in greater detail with reference to FIGS. 9 through 12, receive the plurality of interrupts 64–74 and 82–92 and produce an interrupt 76 and 94 that is provided to the corresponding processing module 40 or 50. In addition, the interrupt gating modules 46 and 56 receive the hardware initialization interrupt 102. In such a configuration, the interrupt gating modules 46 and 56 treat each interrupt in a dynamic manner. Such treatment is based on masking information, reset information, and enable/disable signals received from the operating system kernel 62. Accordingly, the interrupt gating modules 46 and 56 may be dynamically configured to process the corresponding interrupts based on the context of the processing modules 40 and 50 such that when the processing module is executing a particular task that should not be interrupted, masking information is generated to prevent an interrupt from being received. Conversely, the masking information may indicate that a particular processing module is to perform the given interrupt. For example, if an application level interrupt is received, and processing module 40 is executing the application, the interrupt would be masked for processing module 50 and not masked for processing module 40. As such, processing module 40 would process the interrupt while the interrupt would not be presented to processing module 50. This scenario can be done for any interrupt received by the system.

Figure 4:
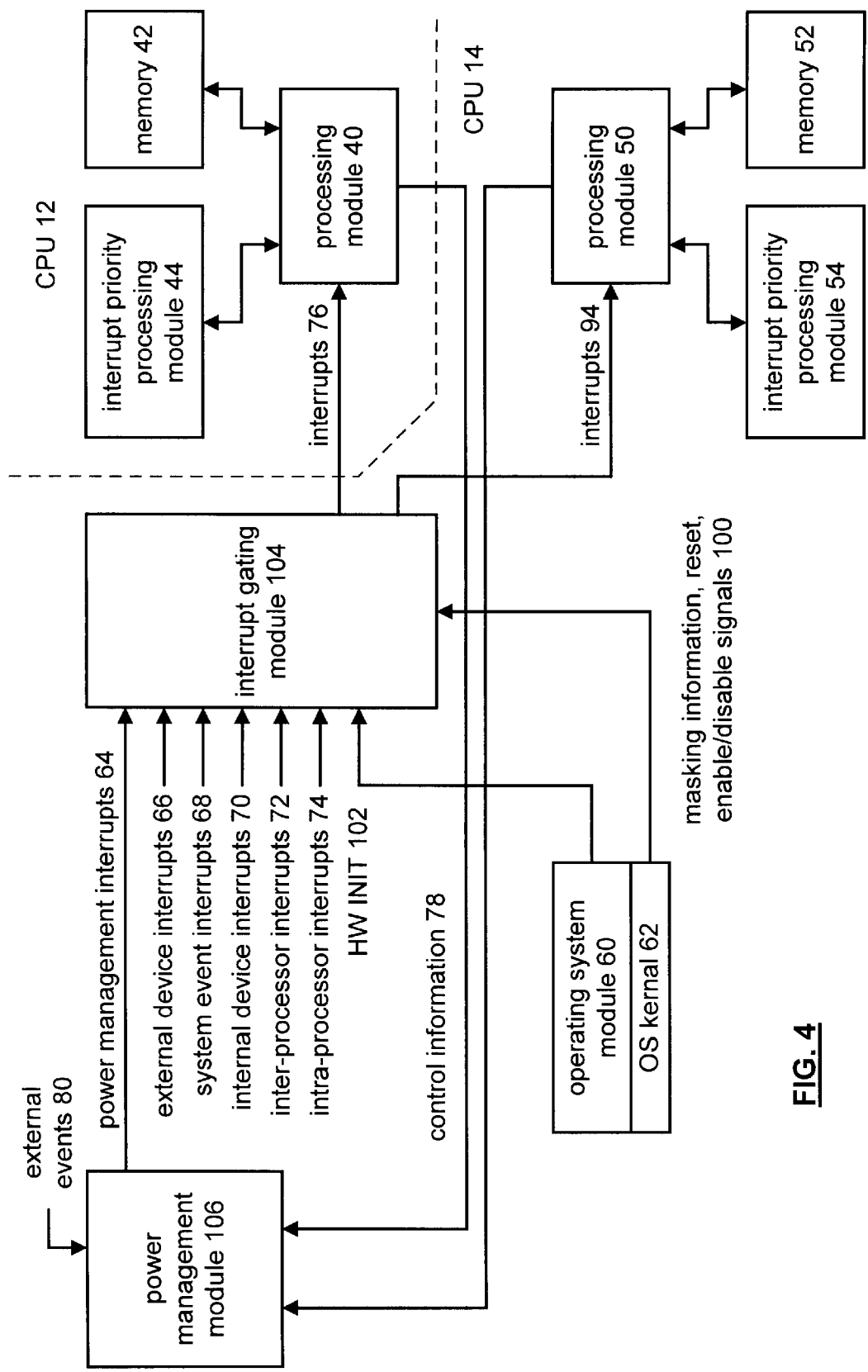
FIG. 4 illustrates an alternate schematic block diagram of the central processing units of FIG. 2 in accordance with the present invention.

FIG. 4 illustrates an alternate schematic block diagram of central processing units 12 and 14. In this embodiment, only central processing unit 14 includes an interrupt gating module 104 and a power management module 106. In this embodiment, both the power management module 106 and interrupt gating module 104 process the power management interrupts and the overall interrupts for both central processing units. In this embodiment, central processing unit 14 includes the operating system module 60 and the operating system kernel 62. As such, the central processing units 12 and 14 of FIG. 4 operate in a similar manner as to the corresponding central processing units of FIG. 3 but utilizing a single power management module and a single interrupt gating module.

The interrupt priority processing modules 44 and 54 enable the corresponding processing modules 40 and 50 to process interrupts in a prioritized manner. As such, when multiple interrupts are received by the corresponding processing module 40 and 50, the processing module evokes the interrupt priority processing module 44 or 54 to determine the prioritization scheme for multiple interrupts. Such factors contributing to the prioritization scheme will be context of the processing module (e.g., whether the processing module is performing display video, keyboard inputs, receiving Ethernet data, transceiving modem information, etc.) type of interrupt, etc. Note that the interrupt priority processing module, as well as the power management module 106, the operating system module 60 and the operating system kernel module 62 may be software elements stored in memory 52 and/or 42 and evoked by the corresponding processing module. Alternatively, the modules 44, 54, 60, 62 and 106 may be separate firmware devices.

Figure 5:
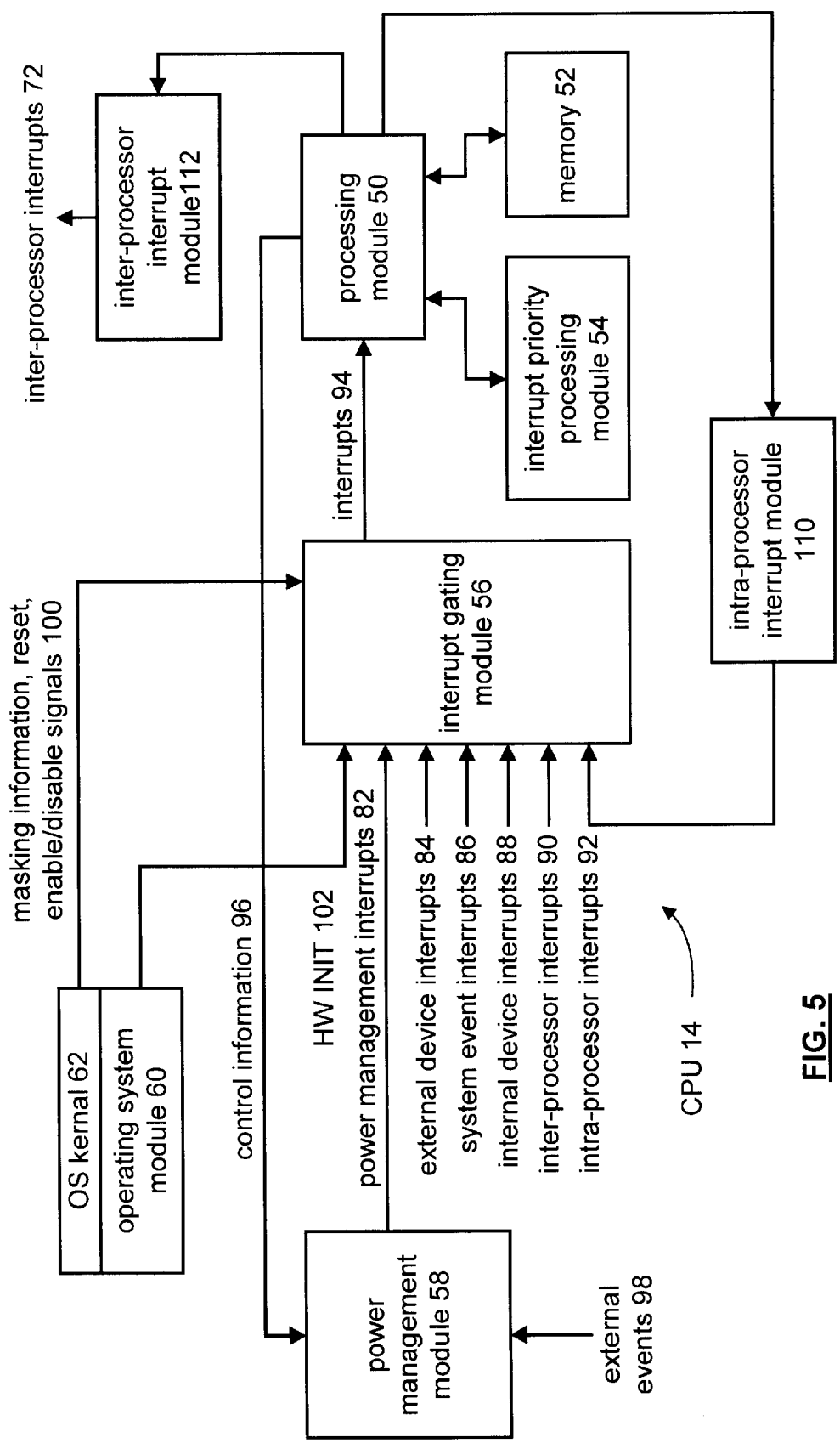
FIG. 5 illustrates a schematic block diagram of a central processing unit for use in a single processor computing system in accordance with the present invention.

FIG. 5 illustrates a schematic block diagram of central processing unit 14. If the computing system 10 includes a central processing unit, the central processing unit would have a similar architecture to that shown in FIG. 5, less the interprocessor interrupt module 112. As shown, the central processing unit 14 includes the processing module 50, memory 52, the interrupt priority processing module 54, the interrupt gating module 56, the power management module 58, the operating system module 60, the operating system kernel module 62, an intraprocessor interrupt module 110 and an interprocessor interrupt module 112. In this embodiment, the processing module 50 via the intraprocessing interrupt module 110 may generate interrupts for itself. Such interrupts may relate to functions being performed by the processing module and may include specific application type interrupts. In addition, the processing module 50 may generate interprocessor interrupts for other processors via the interprocessor interrupt module 112. The processing of the remaining modules of FIG. 5 function as previously discussed with reference to FIGS. 3 and 4.

Figure 6:
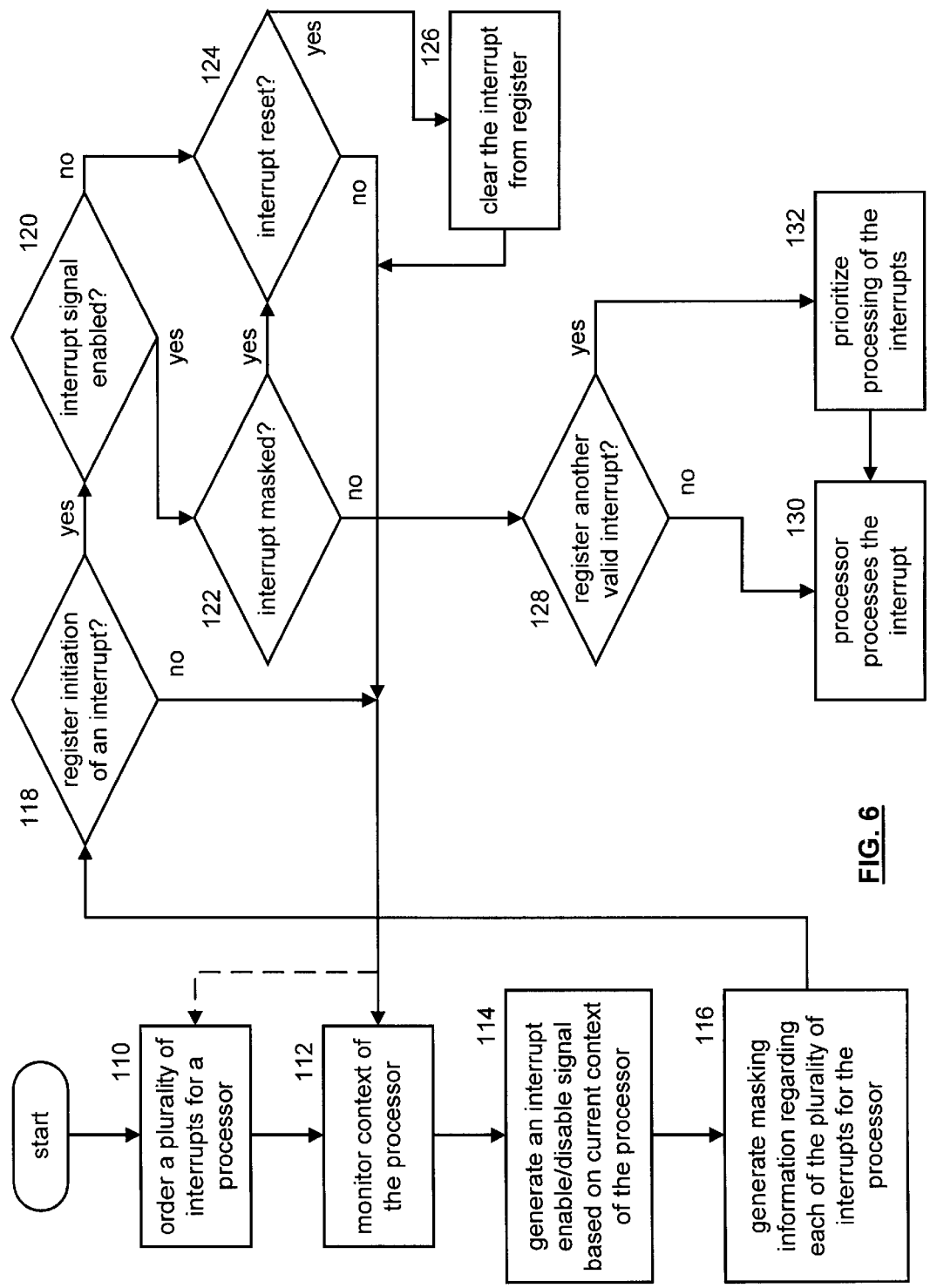
FIG. 6 illustrates a logic diagram of a method for processing interrupts in accordance with the present invention.

FIG. 6 illustrates a logic diagram of a method for processing interrupts in accordance with the present invention. The processing steps shown in FIG. 6 through FIG. 8 may be implemented as operational instructions and stored within any of the modules and/or memory of FIGS. 3 through 5. As such, some of the operational instructions may be executed via the operating system kernel, some by the operating system, some by the processor via the memory, etc.

The processing begins at step 110 where a plurality of interrupts for a given processor is ordered. The plurality of interrupts include system event interrupts, i.e., system level interrupts and external device interrupts, i.e., application level interrupts. The process then proceeds to step 112 where the context of the processor is monitored. As previously mentioned, the context of the processor depends on the current functionality of the processor. For example, there are certain functional modes of the central processing unit that should not be interrupted. In addition, there are certain interrupts that may be more readily performed during particular context of the processing unit. For example, when the processing module is performing video data, interrupts relating to video data are more appropriately processed than, for example, an interrupt related to modem data. Conversely, when the processing unit is functioning to transmit a fax, modem signal interrupts are more appropriate than video display interrupts.

The process then proceeds to step 114 where an interrupt enable/disable signal is generated based on the current context of the processor. As such, when the processor is performing a function that should not be interrupted a global enable/disable signal is disabled such that no interrupts will be provided to the processor. Note that the plurality of interrupts may be ordered into two distinct sets where the first set has a higher priority than the second set. As such, individual enablement signals may be generated for the higher priority set and for the lower priority set. As such, the ordering of the plurality of interrupts into sets provide one type of a prioritization scheme.

The process then proceeds to step 116 where masking information is generated for each of a plurality of interrupts for the processor. The masking information may be based on the current context of the processor such that an individual interrupt may be masked until the processor is in a different mode of operation. In addition, a determination is made as to which processor is to handle the interrupt. As such, the processor to handle the interrupt has the masking information disabled while the processor or processors not designated to handle such an interrupt have the corresponding masking information enabled. As such, only the processor intended to process the interrupt will receive the interrupt.

The process then proceeds to step 118 where a determination is made as to whether initiation of an interrupt has been registered. If not, the process reverts back to step 112. Alternatively, the process may revert back to 110 where the ordering may be re-established. If initiation of an interrupt has been registered, the process proceeds to step 120. At step 120 a determination is made as to whether the interrupt enable/disable signal is enabled. If not, the process proceeds to step 124 where a determination is made as to whether the interrupt has been reset. If the interrupt has not been reset, the process reverts to step 112 or 110.

If, however, the interrupt enable/disable signal is enabled, the process proceeds to step 122 where a determination is made as to whether the interrupt is masked. If the interrupt is not masked, the process proceeds to step 128 where a determination is made as to whether another valid interrupt has been registered. If not, the process proceeds to step 130 where the processor processes the initial interrupt. If another interrupt has been received, the process proceeds to step 132 where the pending interrupts are prioritized. Having prioritized the interrupts, the process proceeds to step 130 where the processor performs the interrupts in accordance with the prioritized manner.

Note that in a multi-processor environment a determination is made as to which processor is to perform a given interrupt. As such, the interrupts are then associated with the corresponding processor. Having associated an interrupt with the corresponding processor, steps 110 through 116 are repeated for each of the plurality of processors.

Returning to step 122 if the interrupt was masked, the process proceeds to step 124. At step 124, as previously discussed, if the interrupt has not been reset, the process reverts to step 110 or step 112. If, however, the interrupt has been reset, the process proceeds to step 126 where the interrupt is cleared from the register. Having cleared the interrupt from the register, the process repeats at step 110 or 112.

Figure 7:
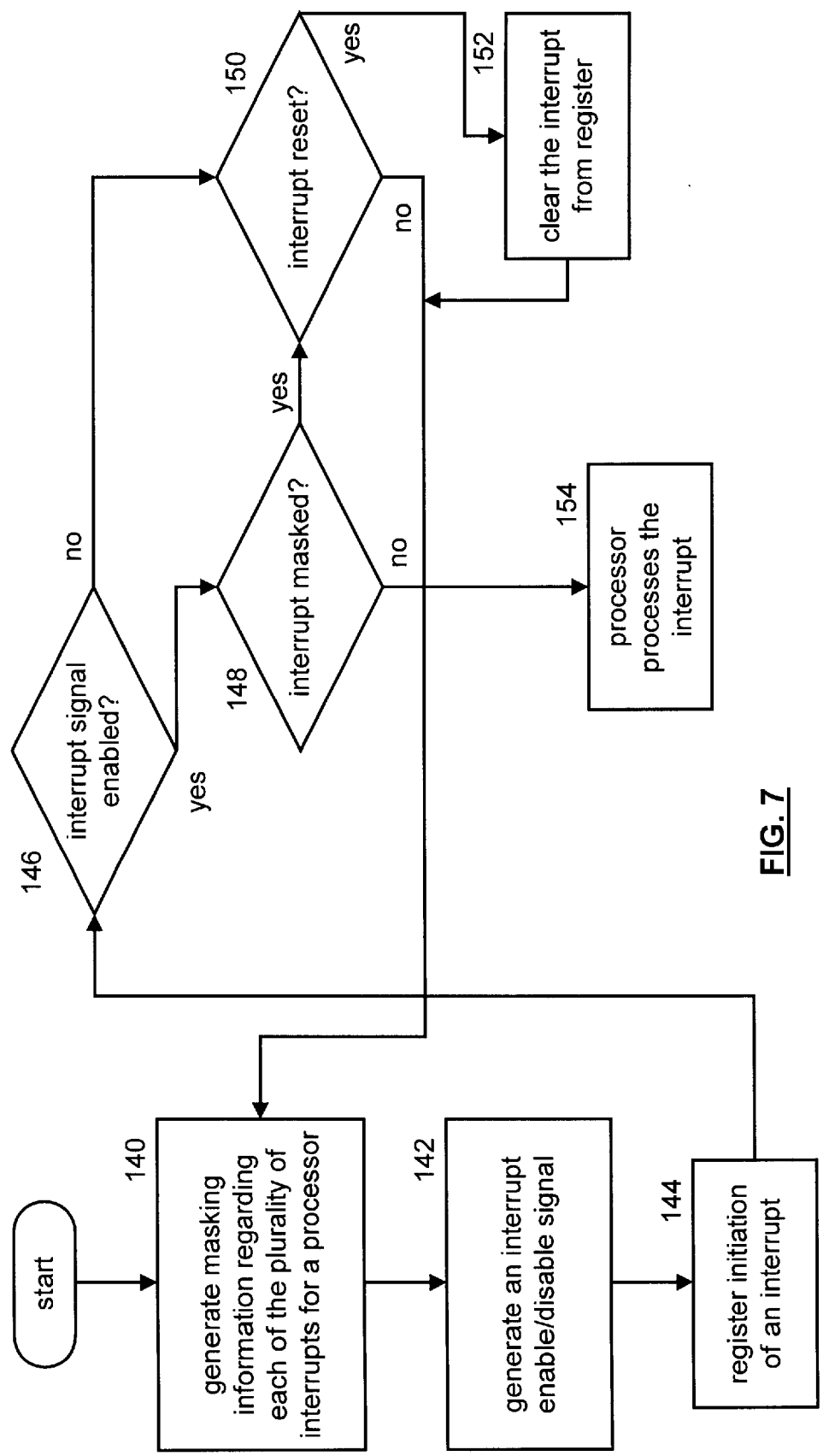
FIG. 7 illustrates a logic diagram of an alternate method for processing interrupts in accordance with the present invention.

FIG. 7 illustrates a logic diagram of an alternate method for processing interrupts in accordance with the present invention. The process begins at step 140 where masking information is generated for each of a plurality of interrupts for a given processor. As previously mentioned, the masking information provides an enable/disable signal for each of the interrupts for the designated processor. The process then proceeds to step 142 where an interrupt enable/disable signal is generated. The interrupt enable/disable signal is a global signal such that regardless of the masking information, the processor will not receive interrupts when the enable/disable signal is disabled.

The process then proceeds to step 144 where initiation of an interrupt is registered. Note that the interrupts may include system level interrupts, application level interrupts, power management interrupts, intraprocessor interrupts and/or interprocessor interrupts. The process then proceeds to step 146 where a determination is made as to whether the interrupt enable/disable signal is enabled. If not, the process proceeds to step 150 where a determination is made as to whether the interrupt has been reset. If the interrupt has been reset, the process proceeds to step 152 where the interrupt is cleared from the register. Having cleared the interrupt from the register, the process repeats at step 140.

If, however, the interrupt enable/disable signal is enabled, the process proceeds to step 148. At step 148, a determination is made as to whether this particular interrupt is masked. If not, the process proceeds to step 154 where the processor processes the interrupt. If, however, the interrupt is masked, the process proceeds to step 150 where a determination is made as to whether the interrupt has been reset. As such, as long as the interrupt remains in the register even if the enable/disabled signal is disabled, and the interrupt is masked, the processor may eventually process the interrupt if the corresponding signals are enabled.

Figure 8:
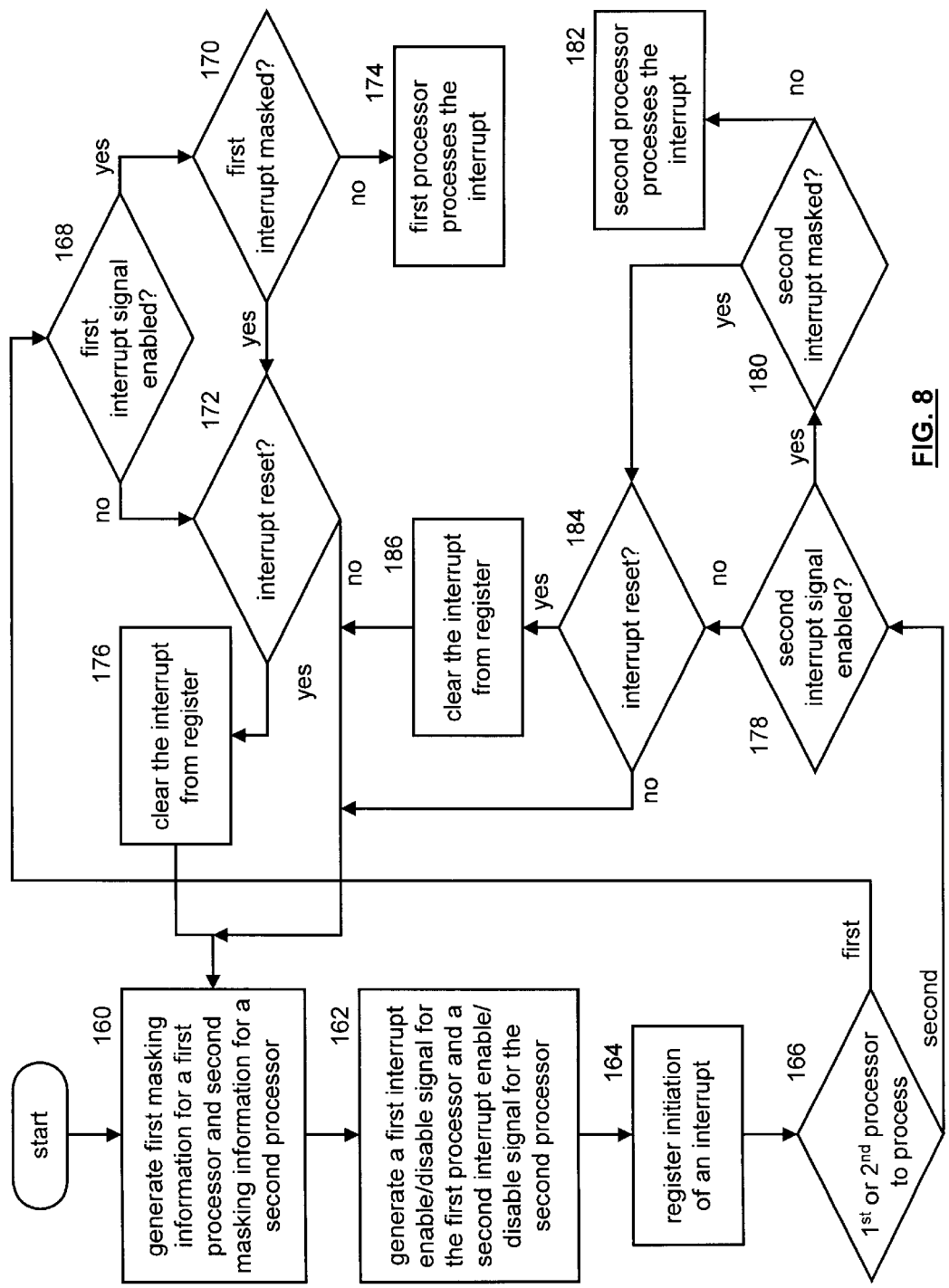
FIG. 8 illustrates a logic diagram of another method for processing interrupts in accordance with the present invention.

FIG. 8 illustrates a logic diagram of yet another method for processing interrupts in accordance with the present invention. The process begins at step 160 where first masking information is generated for a first processor and second masking information is generated for a second processor. The first and second masking information provides a masking enable/disable signal for each of a plurality of interrupts designated for the corresponding first or second processor. The process then proceeds to step 162 where a first interrupt enable/disable signal is generated for the first processor and a second interrupt enable/disable signal is generated for the second processor. The process then proceeds to step 164 where initiation of an interrupt is registered. Note that the interrupt may be a system level interrupt, application level interrupt, application level interrupt, power management interrupt, interprocessor interrupt, and/or intraprocessor interrupt.

The process then proceeds to step 166 where a determination is made as to whether the interrupt is to be processed by the first or second processor. If the interrupt is to be processed by the first processor, the process proceeds to step 168 where a determination is made as to whether the first interrupt enable/disable signal is enabled. If the first interrupt enable/disable signal is enabled, the process proceeds to step 170 where a determination is made as to whether the first interrupt is masked. If not, the process proceeds to step 174 where the first processor processes the interrupt.

If, at step 168, the first interrupt enabled/disabled signal is not enabled, the process proceeds to step 172. At step 172, a determination is made as to whether the interrupt has been reset. If not, the process reverts to step 160. If, however, the interrupt has been reset, the process proceeds to step 176 where the interrupt is cleared from the register. Having cleared the interrupt from the register, the process repeats at step 160. If the first interrupt enable/disable signal is enabled, but the first interrupt is masked, the process also proceeds to step 172. In this manner, the interrupt will remain in the register until processed by the processor or has been reset.

If, at step 166, the interrupt is to be processed by the second processor, the process proceeds to step 178. At step 178, a determination is made as to whether the second interrupt enable/disabled signal has been enabled. If yes, the process proceeds to step 180 where a determination is made as to whether the second interrupt is masked. If not, the process proceeds to step 182 where the second processor processes the interrupt.

If, however, at step 178, the second interrupt enable/disable signal is not enabled, the process proceeds to step 184. At step 184, a determination is made as to whether the interrupt has been reset. If the interrupt has been reset, the process proceeds to step 186 where the interrupt is cleared from the register. Having cleared the interrupt from the register, the process repeats at step 160. If the interrupt has not been reset, the process repeats at step 160. If, at step 178, the second interrupt enable/disable signal is enabled, but the second interrupt is masked, the process reverts to step 184. In this manner, the interrupt will remain in the register until the second processor processes the interrupt or until it is cleared from the register.

Figure 9:
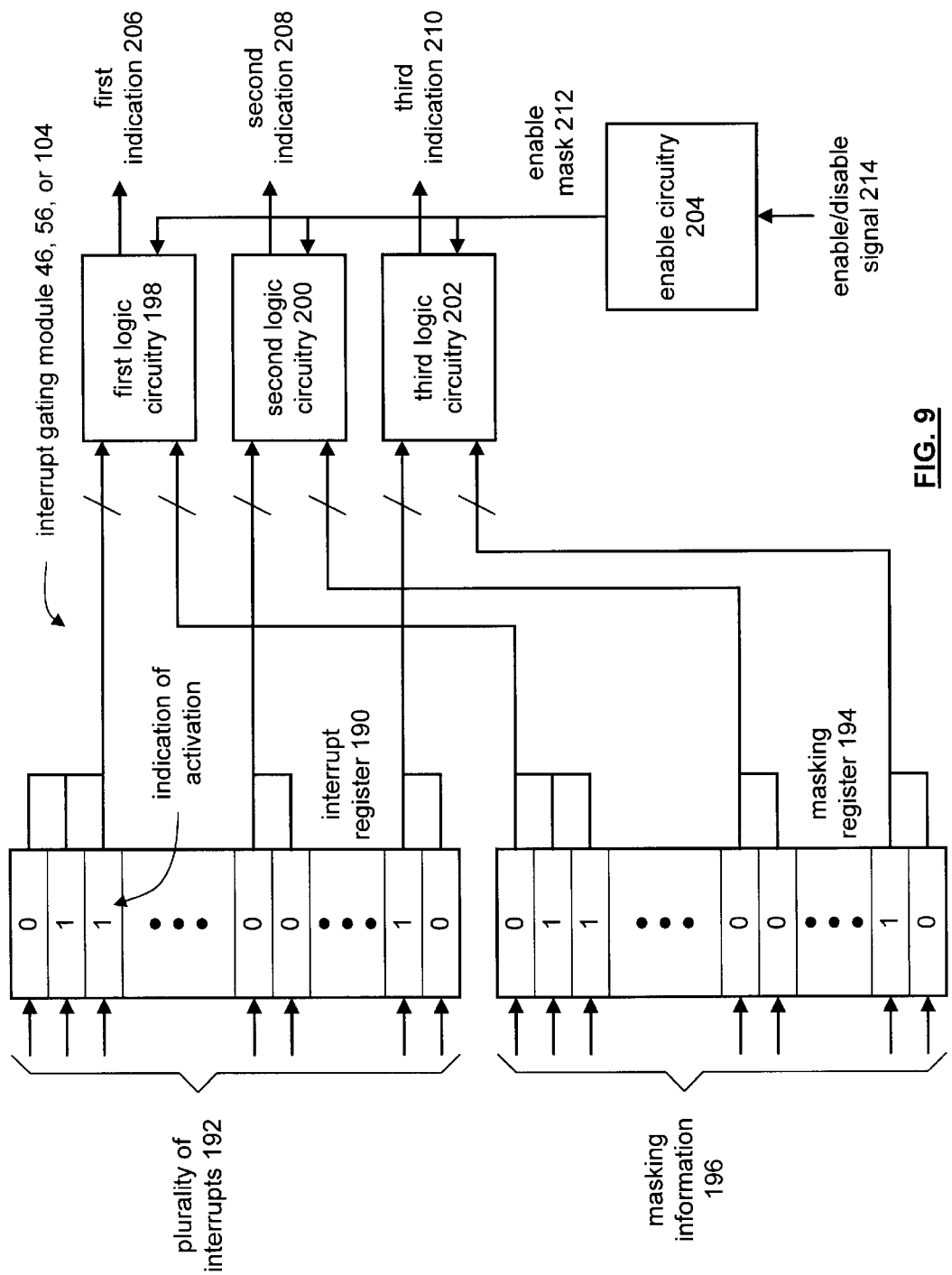
FIG. 9 illustrates a schematic block diagram of an interrupt gating module in accordance with the present invention.

FIG. 9 illustrates a schematic block diagram of the interrupt gating module 46, 56, or 104. The interrupt gating module 46, 56, or 104 includes an interrupt register 190, a masking register 194, first logic circuitry 198, and an enable circuitry 204. The interrupt gating module 46, 56, or 104 may further include a second logic circuitry 200 and a third logic circuitry 202. As one of average skill in the art will appreciate, the interrupt gating module 46, 56, or 104 may include one or a plurality of logic circuits 198 through 202.

In operation, the interrupt register 190 stores an indication of activation for a plurality of interrupts 192. The plurality of interrupts includes system event interrupts, device interrupts (i.e., application level interrupts), power management interrupts, internal device interrupts, interprocessor interrupts, and intraprocessor interrupts. The interrupt register 190 includes a plurality of latches, one for each entry within the register, to latch the initiation of one of the interrupts. Typically, an interrupt will be initiated via a pulse signal. As such, the pulse signal needs to be captured via the latch circuitry and stored within the interrupt register 190.

The masking register 194 includes a plurality of entries, each one having a corresponding entry within the interrupt register 190. The masking register 194 stores masking information 196 for each of the interrupts stored in the interrupt register 190. Note that the ordering of the entries within the registers 190 and 194 may be done to provide a prioritization scheme and/or to allocate interrupts to a particular logic circuit. For example, the first logic circuit 198 may have a highest priority, the second logic circuit may have a second level of priority while the third logic circuit has a least level of priority. As such, the plurality of interrupts 192 and corresponding masking information 196 would need to be ordered such that the corresponding interrupts and masking information are provided to the appropriate logic circuitry.

The first, second and third logic circuits 198–202 include logic circuitry to provide an indication that the corresponding set of interrupts has at least one interrupt enabled. As such, the first logic circuitry 198 generates a first indication 206 that one or more of the interrupts associated therewith is active. Similarly, the second logic circuit 200 generates a second indication and the third logic circuitry 202 generates a third indication 210.

Regardless of whether the interrupt is masked via the masking information 196, the enable circuitry 204, based on a enable/disable signal 214 generates an enable/disable signal 212 that masks or overrides the indications 206–210. Accordingly, the enable circuitry 204 includes logic gates to mask the first, second and/or third indication. Note that the enable circuitry 204 may be a global mask for all of the indications, or individual signals, one for each of the logic circuits 198–202. As such, the enable circuitry 204 may mask the second and third indications while allowing the first to pass. As one of average skill in the art would appreciate, multiple variations of enable and disable of the indications may be achieved.

Figure 10:
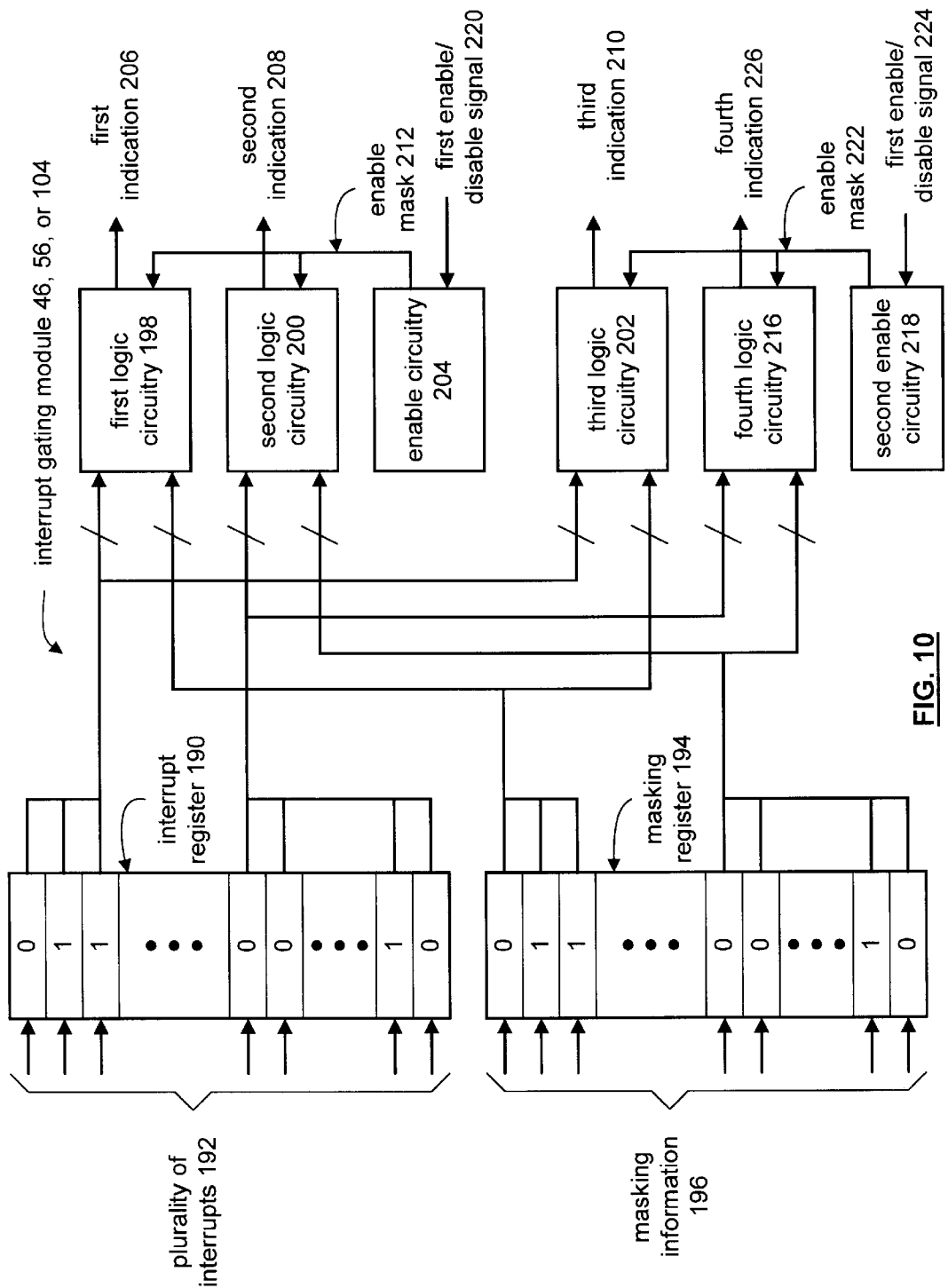
FIG. 10 illustrates an alternate schematic block diagram of an interrupt gating module in accordance with the present invention.

FIG. 10 illustrates the interrupt gating module 46, 56, or 104 interfacing with a plurality of processors. In this embodiment, the first and second logic circuits 198 and 200 and the enable circuit 204 correspond to a first processor while the third and fourth logic circuits 202 and 216 and the second enable circuitry 218 correspond to a second processor. In this embodiment, a single interrupt register 190 and a single masking register 194 are used. As one of average skill in the art would readily appreciate, each processor may have its own registers.

In the embodiment of FIG. 10, the plurality of interrupts 182 is grouped into two sets. The first set of interrupts is provided to the first logic circuitry 198 and to the third logic circuitry 202. The second group of interrupts is provided to the second logic circuitry 200 and the fourth logic circuitry 216. In this embodiment, the first set of interrupts may have a higher priority than the second set of interrupts. The prioritization of interrupts is then utilized by the processor to prioritize interrupts and perform them in an efficient manner. In this embodiment, the masking register 194 will include a plurality of entries in each location. As such, for the first entry in the masking register 194, it will include masking information for the first processor and masking information for the second processor. As such, when the first interrupt in the interrupt register is enabled, the masking information within the masking register will indicate whether the first or second processor is to process the interrupt.

Figure 11:
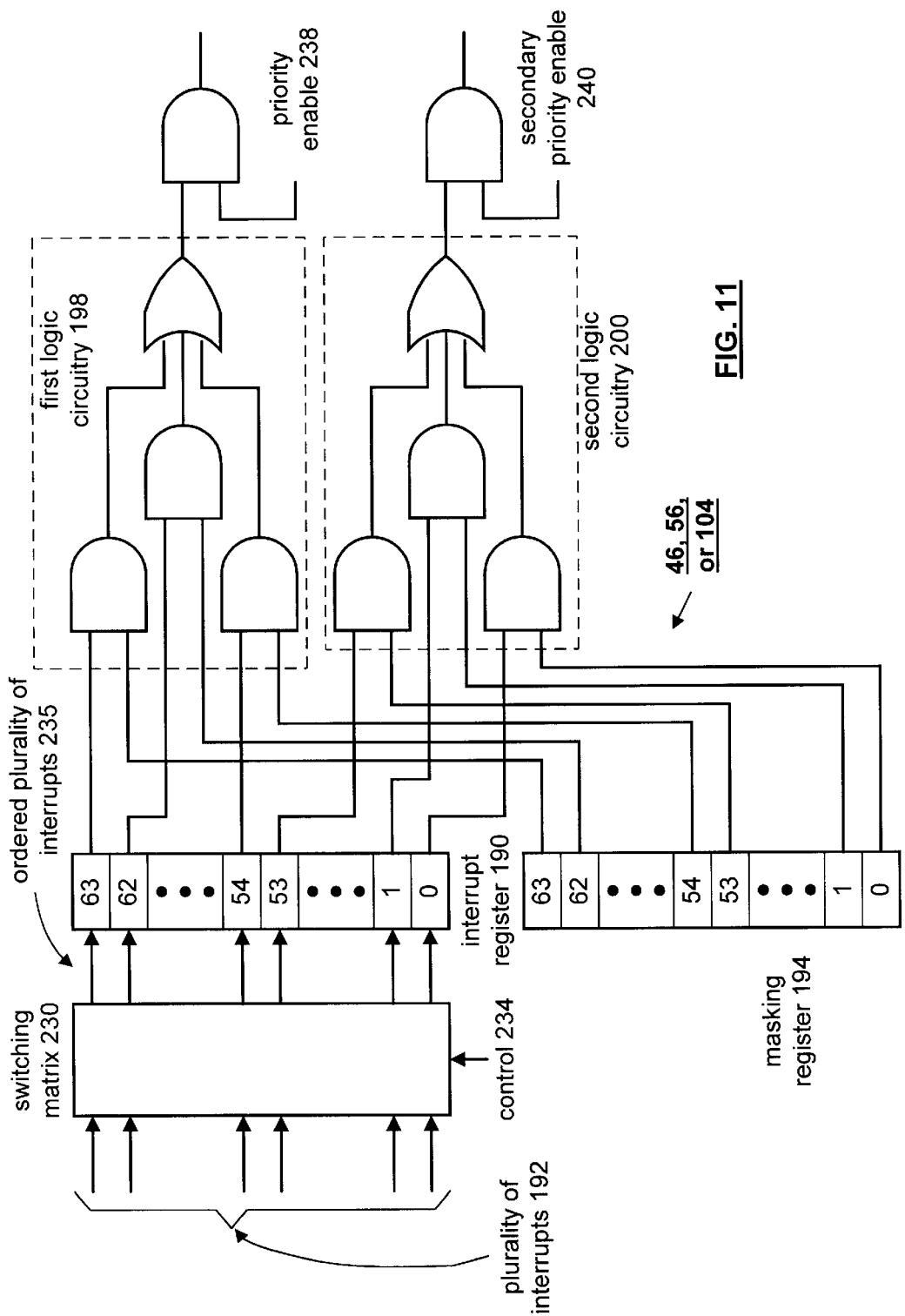
FIG. 11 illustrates a schematic block diagram of an embodiment of an interrupt gating module in accordance with the present invention.

FIG. 11 illustrates a more detailed schematic block diagram of the interrupt gating module 46, 56 or 104. In this embodiment, the plurality of interrupts 192 is provided to a switching matrix 230. The switching matrix 230, based on control signals 234, provides the plurality of interrupts to the interrupt register 190. As such, via the control signals 234, the ordered plurality of interrupts 235 may be dynamically controlled. The operating system kernel would generate the control signals 234. The switching matrix 230 may be a plurality of multiplexors and/or logic circuits to provide the corresponding routing of interrupts to the interrupt register 190.

The first logic circuitry 198 and the second logic circuitry 200 are shown to include a plurality of logic gates. As shown, the indication of initiation for an interrupt in the interrupt register is ANDed with the masking information stored in the masking register 194. As such, if an interrupt is enabled, and the masking information is enabled, the AND gate will output a logic one. Each of the AND gates output is then ORed to produce the corresponding indication. The enable circuitry includes an AND gate that ANDs the output of the OR gate of the first or second logic circuitry 198 or 200 with an enable signal 238 or 240. The resulting indication is provided to the processing module. As such, if the output of the enable signal is high, the processor is alerted that it has an interrupt to process and then accesses the interrupt register to determine the particular interrupt to be processed. If multiple interrupts are to be processed, the processing module utilizes a prioritization scheme as previously discussed.

Figure 12:
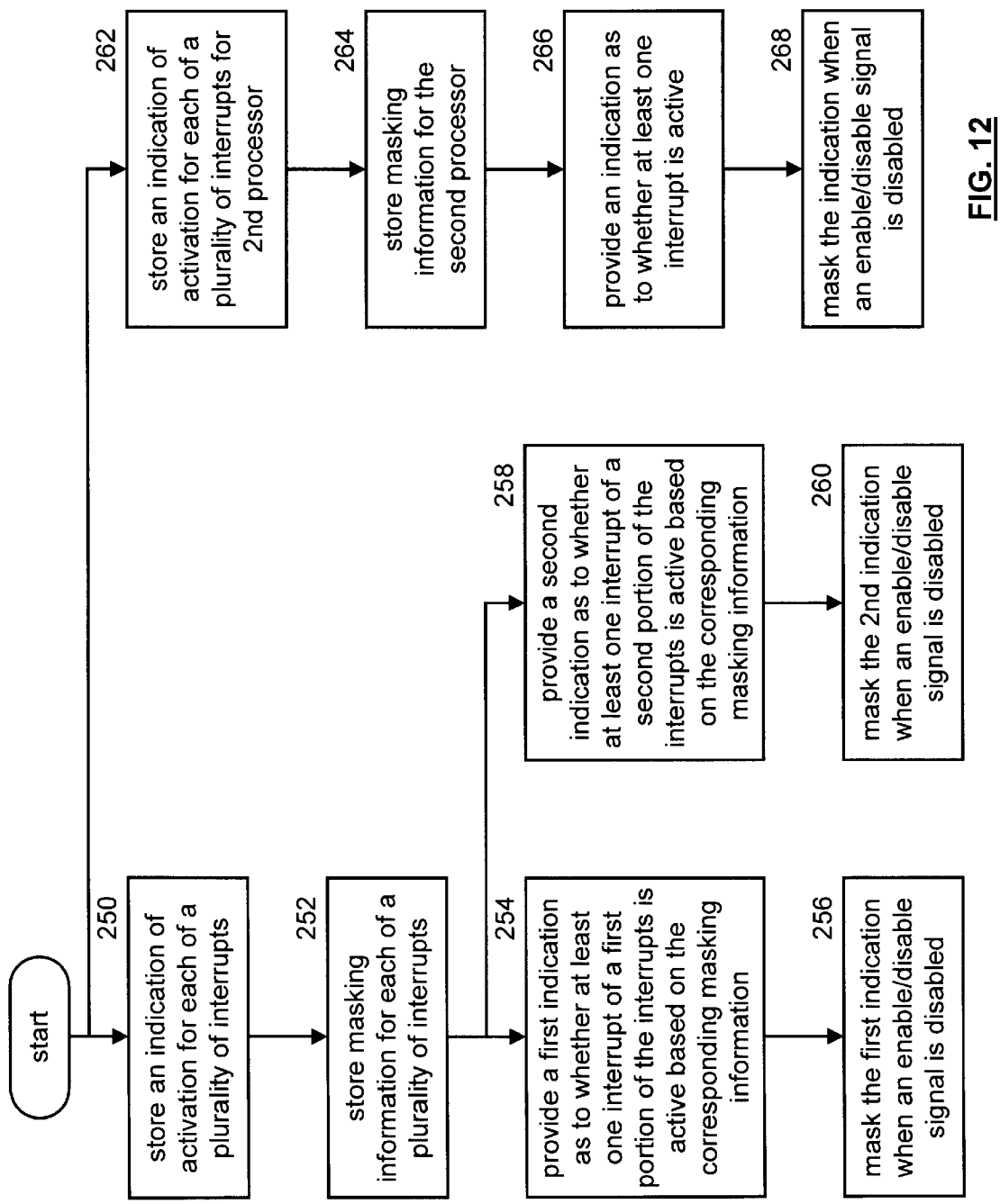
FIG. 12 illustrates a logic diagram of a method for gating interrupts in accordance with the present invention.

FIG. 12 illustrates a logic diagram of a method for gating interrupts in accordance with the present invention. The processing steps of FIG. 12 may be stored as operational instructions in memory 42 or 52 and executed by processing module 40 and/or 50 in conjunction with the circuitry comprising the interrupt gating modules 46 and 56.

The process begins at step 250 where an indication of activation for each of the plurality of interrupts is stored. The plurality of interrupts includes system level interrupts, application level interrupts, power management interrupts, internal device interrupts, interprocessor interrupts, and/or intraprocessor interrupts. The process then proceeds to step 252 where masking information is stored for each a plurality of interrupts. Note that steps 250 and 252 may be performed in parallel or step 252 may be processed first. The process then proceeds to step 254 where a first indication is provided as to whether at least one interrupt of a first portion of the interrupts is activated based on the corresponding masking information. Note that the first portion of the interrupts may have a higher priority than a second portion. In one embodiment, the plurality of interrupts are treated with like priority, and in other embodiments the interrupts are divided into multiple sets where each set has a varying level of priority. The process then proceeds to step 256 where the first indication is masked when an enable/disable signal is disabled.

If the gating of interrupts includes multiple levels of priority, processing steps 258 and 260 are also performed. At step 258 a second indication as to whether at least one interrupt of a second portion of the interrupts is active based on corresponding masking information. The process then proceeds to step 260 where the second indication is masked when an enable/disable signal is disabled.

If the computing system includes a plurality of processors, the gating of interrupts 20 will include steps 262 through 268. Such steps are performed in parallel with steps 250 through 256 and/or through steps 260. At step 262 an indication of activation for each of a plurality of interrupts for a second processor is stored. The process then proceeds to step 264 where masking information is stored for the second processor. The process then proceeds to step 266 where an indication is provided as to whether at least one interrupt for the second processor is active. The process then proceeds to step 266 where an indication is provided as to whether at least one interrupt for the second processor is active. The process then proceeds to step 268 where the indication is masked when a second enable/disable signal is disabled.

Figure 13:
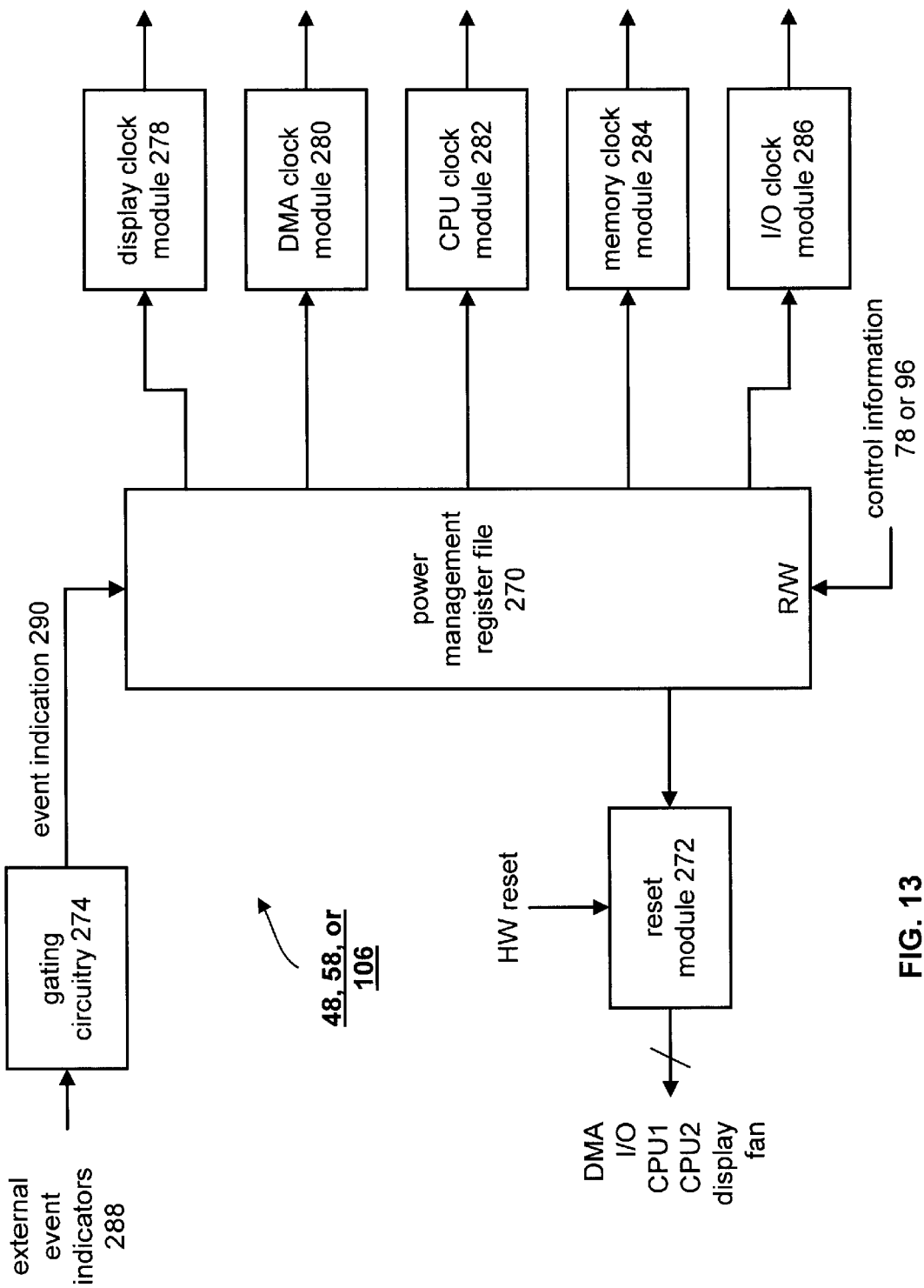
FIG. 13 illustrates a schematic block diagram of a power management module in accordance with the present invention.

FIG. 13 illustrates a schematic block diagram of the power management module 48, 58, or 106. As shown, the power management module includes gating circuitry 274, reset module 272, power management register file 270 and a plurality of clock modules 278 through 286. In this configuration, the power management module 48, 58 or 106 can control the enablement and disablement of any one of the clocks as well as the rate of any one of the clocks. In addition, the module 48, 58, or 106 may reset any one of a plurality of modules. In general, the enablement of a computer sleep mode is controlled by the central processing unit while waking up is controlled by an external event 268. As such, the central processing unit can coordinate power savings at various levels by turning off one or more of the clock modules, enabling the clocks at different rates when the system is woken up, and changing the rate of the clocks, etc.

The gating circuitry 274 is operably coupled to receive external event indicators 268 and provide event indications 290 to the power management register file 270. In addition, the power management register file 270 receives control information 78 or 96. In this manner, the register file 270 stores the event indication 290 and corresponding control information. For example, the control information may indicate the rate of the display clock, enablement of the display clock, and/or any other one of the clocks. Such a rate may be established prior to resetting the corresponding element or putting the computer to sleep. As such, when the computer awakens, the corresponding clock function is re-established at the rate set prior to resetting. As one of average skill in the art would readily appreciate, a variety of combinations of power savings may be achieved by enabling and disabling the clocks, changing rates and/or resetting the corresponding devices.

Figure 14:
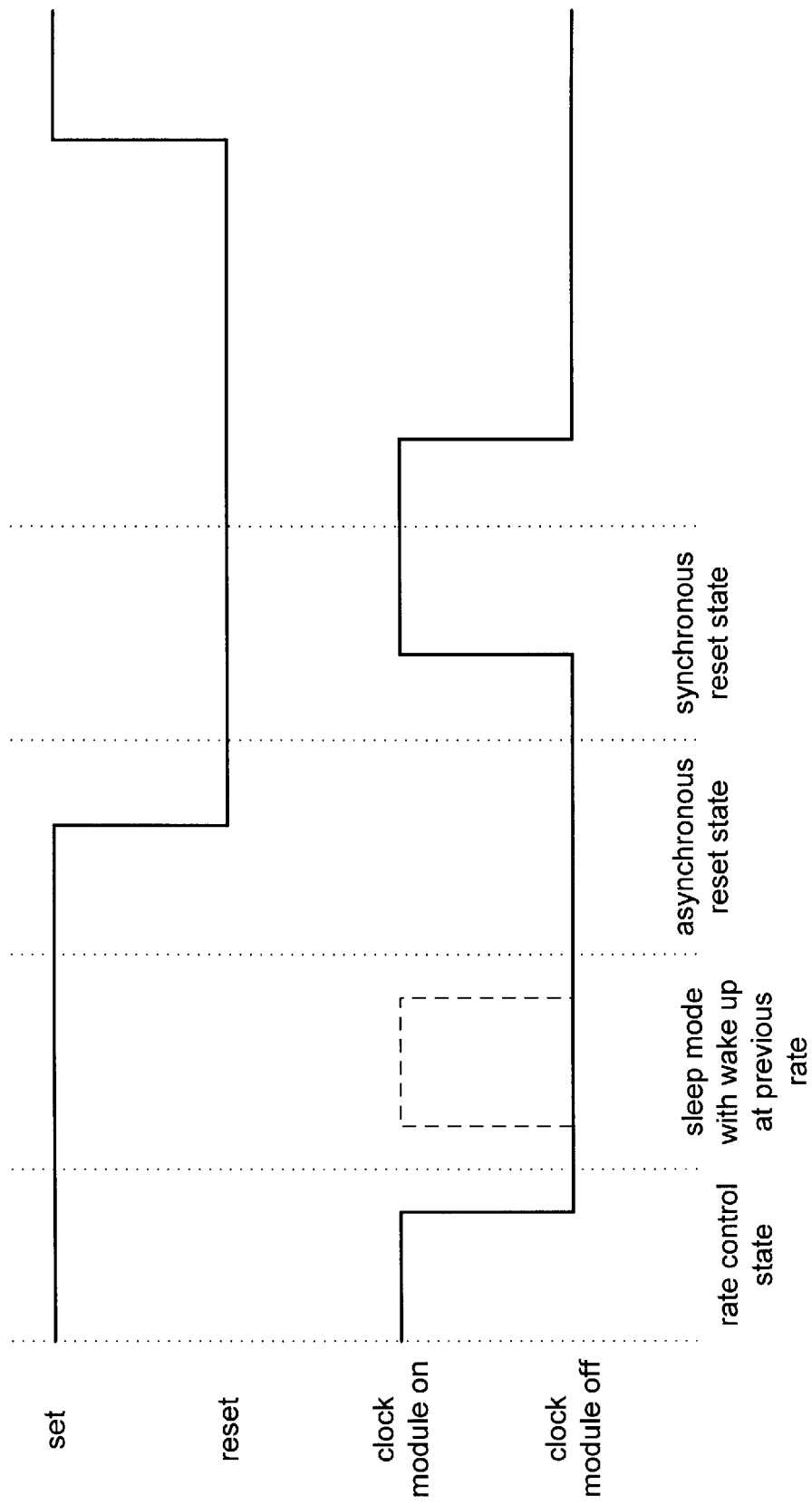
FIG. 14 illustrates a diagram for various interrupt states in accordance with the present invention.

FIG. 14 illustrates a graphical representation of the various modes, or states, for resetting and/or for power management savings. During a rate control state, the reset signal is disabled (i.e., in the set position) wherein changes of the clock module enable will change the rate, and/or disable the clock. The second state occurs with the reset signal disabled and a clock being re-enabled after being disabled. In this mode, the clock rate will be re-established at the rate that it was when disabled.

The next state occurs for an asynchronous reset. In this state, the clock is disabled when the corresponding element is reset. In this state, the resetting of the clock and/or enabling of the clock are asynchronous. As such, when the clock is re-established, it will be based on default parameters.

Another state for power management is a synchronous reset state. In this state, the clock is enabled prior to the corresponding element being reset. As such, when the corresponding element is activated, the clock rate will be at a known rate.

Figure 15:
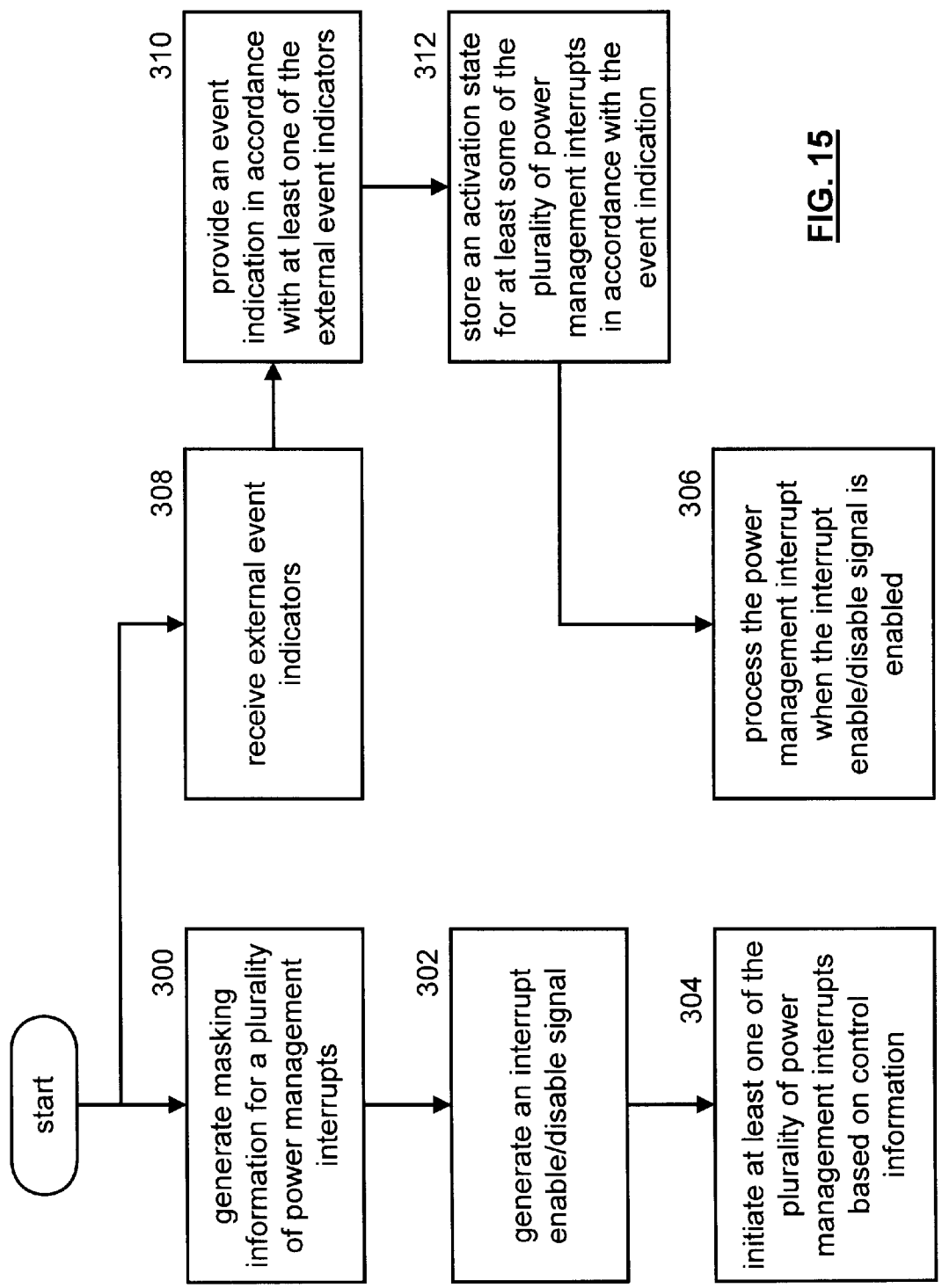
FIG. 15 illustrates a logic diagram of a method for processing power management interrupts in accordance with the present invention.

FIG. 15 illustrates a logic diagram of a method for processing power management interrupts in accordance with the present invention. The processing steps of FIG. 15 may be implemented as operational instructions and executed by processing module 40 or 50 in conjunction with the processing modules of FIG. 3.

The process begins at step 300 where masking information for a plurality of power management interrupts is generated. Note that each clock may have its own power management interrupts as well as each corresponding element (e.g., DMA, I/O, CPU 1, CPU 2, display, fan, etc.). As such a power management interrupt may include enable/disable of a clock and/or corresponding element and further include a rate of change for the corresponding element. The process then proceeds to step 302 where an interrupt enable/disable signal is generated. The process then proceeds to 304 where at least one of the plurality of power management interrupts is initiated based on control information. The process then proceeds to 304 where at least one of the plurality of power management interrupts is initiated based on control information.

In parallel with steps 300 through 306, or as a separate and subsequent process, the process performs steps 308 through 312. At step 308 an external event indicator is received. The process then proceeds to step 310 where an event indication is provided in accordance with at least one of the external event indicators. The process then proceeds to step 312 where an activation state for at least some of the plurality of power management interrupts is stored in accordance with the event indication. The process then proceeds to step 306 where the power management interrupt is processed when the interrupt enable/disable signal is enabled. The power interrupt may be processed by a processor to change the rate of one of the plurality of clocks shown in FIG. 14 and/or to reset one of the plurality of elements shown in FIG. 13. As one of average skill in the art would appreciate, the power management operation may be executed for a single processor or a plurality of processors. For a plurality of processors, steps 300 through 312 would be executed for each individual processor.

The preceding discussion has presented a method and apparatus for an efficient manner of handling interrupts within a computer system. By treating each interrupt in a similar fashion, and utilizing the structures described herein, interrupts may be dynamically processed. In addition, interrupts may be added or deleted from the computing system without requiring changes in hardware. As one of average skill in the art will appreciate, other embodiments may be derived from the teachings of the present invention without deviating from the scope of the claims.

What is claimed is:

1. An interrupt gating module comprises:
   an interrupt register operable to store an indication of activation for each of a plurality of interrupts;
   a masking register operable to store masking information for each of the plurality of interrupts;
   first logic circuitry operably coupled to a first portion of the interrupt register that corresponds to a first portion of the plurality of interrupts and to a first portion of the masking register that corresponds to the first portion of the plurality of interrupts, wherein the first logic circuitry provides a first indication as to whether at least one interrupt of the first portion of interrupts is active;
   second logic circuitry operably coupled to a second portion of the interrupt register that corresponds to a second portion of the plurality of interrupts and to a second portion of the masking register that corresponds to the second portion of the plurality of interrupts, wherein the second logic circuitry provides a second indication as to whether at least one interrupt of the second portion of interrupts is active; and
   enable circuitry operably coupled to the first and second logic circuitry and is operably coupled to receive an enable/disable signal, wherein the enable circuitry masks the first and second indications when the enable/disable signal is disabled.

2. The interrupt gating module of claim 1 further comprises:
   third logic circuitry operably coupled to a third portion of the interrupt register that corresponds to a third portion of the plurality of interrupts and to a third portion of the masking register that corresponds to the third portion of the plurality of interrupts, wherein the third logic circuitry provides a third indication as to whether at least one interrupt of the third portion of interrupts is active, wherein the enable circuitry masks the third indication when the enable/disable signal is disabled.

3. The interrupt gating module of claim 1, wherein the interrupt register further comprises a plurality of register locations, wherein each register location of the plurality of register locations maps to a corresponding one of the plurality of interrupts.

4. The interrupt gating module of claim 3, wherein the corresponding ones of the plurality of interrupts that map to the first portion of the interrupt register having a higher priority than the corresponding ones of the plurality of interrupts that map to the second portion of the interrupt register.

5. The interrupt gating module of claim 3, wherein the plurality of interrupts includes system event interrupts, external device interrupts, inter-processor interrupts, and intra-processor interrupts.

6. The interrupt gating module of claim 5, wherein the registers locations that map to the inter-processor interrupts and to the intra-processor interrupts are read/write register locations with respect to a processor and the register locations that map to the system event interrupts and the external device interrupts are read register locations with respect to the processor.

7. The interrupt gating module of claim 1, wherein the interrupt register further comprises a plurality of latching circuits that latch the indication of activation for the each of the plurality of interrupts.

8. The interrupt gating module of claim 1 further comprises:
   third logic circuitry;
   fourth logic circuitry; and
   second enable circuitry,
   wherein the interrupt register stores the indication of activation for each of a first and second plurality of interrupts, wherein the first plurality of interrupts are for a first processor and the second plurality of interrupts are for a second processor;
   wherein the masking register stores the masking information for each of the first and second plurality of interrupts;
   wherein the first logic circuitry is operably coupled to the first portion of the interrupt register that corresponds to a first portion of the first plurality of interrupts and to the first portion of the masking register that corresponds to the first portion of the first plurality of interrupts;
   wherein the second logic circuitry is operably coupled to the second portion of the interrupt register that corresponds to a second portion of the first plurality of interrupts and to the second portion of the masking register that corresponds to the second portion of the first plurality of interrupts;
   wherein the third logic circuitry is operably coupled to a third portion of the interrupt register that corresponds to a first portion of the second plurality of interrupts and to a third portion of the masking register that corresponds to the first portion of the second plurality of interrupts, wherein the third logic circuitry provides a third indication as to whether at least one interrupt of the first portion of the second plurality of interrupts is active; and wherein the fourth logic circuitry is operably coupled to a fourth portion of the interrupt register that corresponds to a second portion of the second plurality of interrupts and to a fourth portion of the masking register that corresponds to the second portion of the second plurality of interrupts, wherein the fourth logic circuitry provides a fourth indication as to whether at least one interrupt of the second portion of the second plurality of interrupts is active.

9. A method for facilitating processing of interrupts, the method comprises the steps of:

a) storing an indication of activation for each of a plurality of interrupts;

b) storing masking information for each of the plurality of interrupts;

c) providing a first indication as to whether at least one interrupt of a first portion of the plurality of interrupts is active based on a corresponding first portion of the masking information; and d) masking the first indication when an enable/disable signal is disabled.

10. The method of claim 9 further comprises:

providing a second indication as to whether at least one interrupt of a second portion of the plurality of interrupts is active based on a corresponding second portion of the masking information; and masking the second indication when a second enable/disable signal is disabled.

11. The method of claim 10 further comprises:

providing a third indication as to whether at least one interrupt of a third portion of the plurality of interrupts is active based on a corresponding third portion of the masking information; and masking the third indication when a third enable/disable signal is disabled.

12. The method of claim 10 further comprises establishing the first portion of the plurality of interrupts to have a higher priority than the second portion of the plurality of interrupts.

13. The method of claim 9, wherein the plurality of interrupts includes system event interrupts, external device interrupts, inter-processor interrupts, and intra-processor interrupts.

14. The method of claim 9 further comprises:

storing a second indication of activation for each of a second plurality of interrupts for a second processor;

storing second masking information for each of the second plurality of interrupts for a second processor;

providing an indication as to whether at least one interrupt of a first portion of the second plurality of interrupts is active based on a corresponding first portion of the second masking information; and masking the indication when a second enable/disable signal is disabled.

15. An interrupt gating module comprises:

a processing module; and memory operably coupled to the processing module, wherein the memory includes operational instructions that cause the processing module to: (a) store an indication of activation for each of a plurality of interrupts; (b) store masking information for each of the plurality of interrupts; (c) provide a first indication as to whether at least one interrupt of a first portion of the plurality of interrupts is active based on a corresponding first portion of the masking information; and (d) mask the first indication when an enable/disable signal is disabled.

16. The interrupt gating module of claim 15, wherein the memory further comprises operational instructions that cause the processing module to:

provide a second indication as to whether at least one interrupt of a second portion of the plurality of interrupts is active based on a corresponding second portion of the masking information; and mask the second indication when a second enable/disable signal is disabled.

17. The interrupt gating module of claim 16, wherein the memory further comprises operational instructions that cause the processing module to:

provide a third indication as to whether at least one interrupt of a third portion of the plurality of interrupts is active based on a corresponding third portion of the masking information; and mask the third indication when a third enable/disable signal is disabled.

18. The interrupt gating module of claim 16, wherein the memory further comprises operational instructions that cause the processing module to establish the first portion of the plurality of interrupts to have a higher priority than the second portion of the plurality of interrupts.

19. The interrupt gating module of claim 15, wherein the plurality of interrupts includes system event interrupts, external device interrupts, inter-processor interrupts, and intra-processor interrupts.

20. The interrupt gating module of claim 15, wherein the memory further comprises operational instructions that cause the processing module to:

store a second indication of activation for each of a second plurality of interrupts for a second processor;

store second masking information for each of the second plurality of interrupts for a second processor;

provide an indication as to whether at least one interrupt of a first portion of the second plurality of interrupts is active based on a corresponding first portion of the second masking information; and mask the indication when a second enable/disable signal is disabled.

* * * * *